United States Patent
Watanabe et al.

(10) Patent No.: US 9,506,442 B2
(45) Date of Patent: Nov. 29, 2016

(54) ASSEMBLY METHOD AND MACHINE OF DIRECT INJECTOR UNIT

(71) Applicant: HONDA MOTOR CO., LTD., Tokyo (JP)

(72) Inventors: Yasuo Watanabe, Tochigi (JP); Takeshi Hara, Tochigi (JP); Yusuke Miho, Tochigi (JP); Hiroshi Yoshioka, Tochigi (JP); Kenichi Yokoo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 631 days.

(21) Appl. No.: 13/740,773

(22) Filed: Jan. 14, 2013

(65) Prior Publication Data

US 2013/0186372 A1 Jul. 25, 2013

(30) Foreign Application Priority Data

Jan. 24, 2012 (JP) .................. 2012-012086

(51) Int. Cl.
 *B23P 19/04* (2006.01)
 *F02M 69/04* (2006.01)
 *F02M 61/14* (2006.01)
 *B23P 19/12* (2006.01)

(52) U.S. Cl.
 CPC ........... *F02M 69/042* (2013.01); *F02M 61/14* (2013.01); *B23P 19/042* (2013.01); *B23P 19/12* (2013.01)

(58) Field of Classification Search
 CPC .. F02M 69/042; F02M 69/045; F02M 61/14; B23P 19/042; B23P 19/10; B23P 19/12; Y10T 29/53539
 See application file for complete search history.

(56) References Cited

U.S. PATENT DOCUMENTS

2010/0139072 A1* 6/2010 Shinohara ............. B23P 19/042
 29/428

FOREIGN PATENT DOCUMENTS

| JP | 2003-239828 A | 8/2003 |
|---|---|---|
| JP | 2008-163780 A | 7/2008 |
| JP | 2009-191636 A | 8/2009 |
| JP | 2010-19132 A | 1/2010 |

OTHER PUBLICATIONS

Office Action, Japanese Application No. 2012-012086 issued Sep. 17, 2013.

* cited by examiner

*Primary Examiner* — Christopher Besler
(74) *Attorney, Agent, or Firm* — Rankin, Hill & Clark LLP

(57) ABSTRACT

A direct injector unit includes a fuel pipe and injectors fixed to the fuel pipe. The direct injector unit is assembled to a cylinder head by: mounting the cylinder head in a predetermined posture; holding the direct injector unit while positioning a reference injector and guiding remaining injectors such that their leading end portions are movable; and inserting the injectors into injector mounting holes of the cylinder head by relatively moving the direct injector unit toward the cylinder head in a state in which the reference injector is positioned with respect to a corresponding injector mounting hole.

3 Claims, 5 Drawing Sheets

ASSEMBLY METHOD AND MACHINE OF DIRECT INJECTOR UNIT

CROSS REFERENCE TO RELATED APPLICATION

This application claims priority to Japanese Patent Application No. 2012-012086 filed on Jan. 24, 2012, the entire contents of which are incorporated by reference herein.

BACKGROUND OF THE INVENTION

Field of the Invention

The present invention relates to a method and apparatus for assembling a direct injector unit to a cylinder head.

Related Art

In a direct injection engine mounted on a vehicle such as an automobile in which fuel is directly injected into a combustion chamber, injectors of a direct injector unit are assembled to a cylinder head by pressing the injectors into a plurality of injector mounting holes formed in the cylinder head. The direct injector unit includes multiple injectors whose number is the same as or larger than that of cylinders, and a fuel pipe to which the multiple injectors are fixed. The fuel-inlet-side end portion of each injector is fit into a connection portion formed around the fuel pipe, whereby the corresponding injector is connected to the fuel pipe. Therefore, depending on a fitting condition of the injectors and the fuel pipe, a variation may be generated in a posture of a leading end portion of each injector. Also, due to a manufacturing error of the injector mounting holes of the cylinder head or the like, when the injectors are inserted into the injector mounting holes of the cylinder head, the leading end portions of the injectors may come into contact with the injector mounting holes, resulting in damages to the injector mounting holes or the injectors.

In order to cope with this problem, there has been disclosed an assembly method and guide tools in which guide tools 103 screwed into screw holes 102 of a cylinder head 101 are inserted into through-holes 105 of a delivery pipe (fuel pipe) 104 as shown in FIG. 5 such that postures of injectors 106 are corrected by being guided by the guide tool 103, whereby an assembly of an injector unit 107 is performed while worker's burden is reduced (see JP-A-2010-019132, for example).

Also, according to a known a fuel injection valve assembly and its manufacturing method as shown in FIG. 6, a fuel injection valve assembly 116 is configured by mounting collar members 111, stopper members 112, and a plurality of fuel injection valves 113 on a single rail member 115 in advance, and then a cylinder head of an engine is assembled with the fuel injection valve assembly 116 (see JP-A-2003-239828, for example).

However, according to the methods of JP-A-2010-019132 and JP-A-2003-239828, it is necessary to mount the guide tools 103 for assembly, or the collar members 111 and the stopper members 112 in advance. Thus, a man-hour for mounting or a man-hour for demounting increases, resulting in a reduction in productivity. Also, in a site having a large production volume or a large number of models, a quantity or number of tools or the number of kinds of tools that should be prepared increases, and a return mechanism for returning a used tool or jig to a mounting process is necessary. Further, since a tool, a jig, or the like is mounted to the cylinder head or the injectors to finally become a product, damages may be caused by contact, generated chips may bite into the product, or screw holes used once to mount a jig may be reused for fastening, resulting in a reduction in product quality. Furthermore, assurance quality may be reduced due to a reduction in a function or accuracy attributable to jig wear, or variation in assembling accuracy may be caused by differences in jig handing abilities among workers. Therefore, it is difficult to keep product quality constant.

SUMMARY OF THE INVENTION

One or more embodiments provide a direct-injector-unit assembly method and apparatus capable of reducing a man-hour for assembling, capable of assembling a direct injector unit to a cylinder head with a high degree of accuracy regardless of the degree of worker's proficiency, and capable of ensuring a good quality.

DETAILED DESCRIPTION OF THE EMBODIMENTS

Figure 1A:
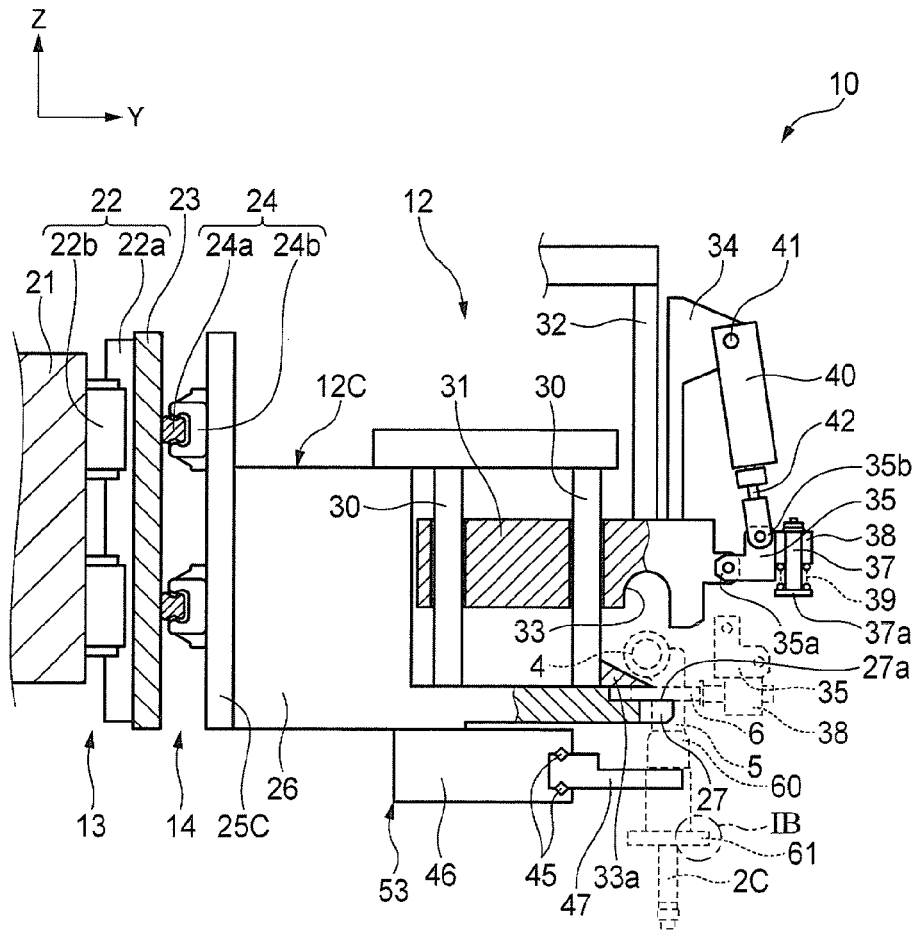
FIG. 1A is a cross-sectional view taken along a line I-I of FIG. 3 for illustrating an assembly apparatus in which a direct-injector-unit assembly method is used.
Figure 1B:
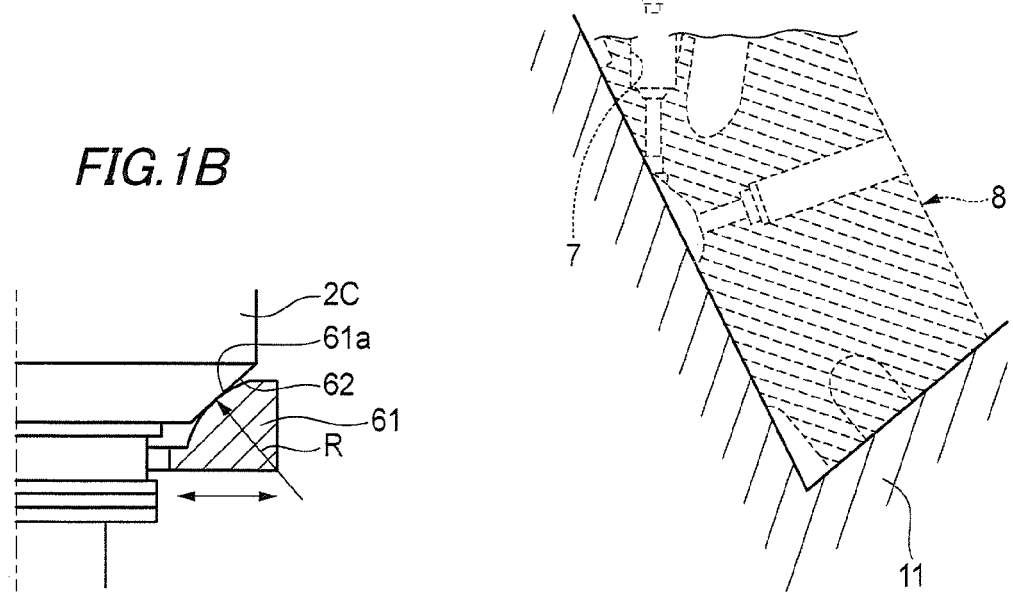
FIG. 1B is an enlarged cross-sectional view illustrating a portion IB of FIG. 1A.

A direct-injector-unit assembly method and assembly apparatus according to an exemplary embodiment will be described in detail with reference to the accompanying drawings.

In the exemplary embodiment, as shown in FIGS. 1A to 3, a direct injector unit 1 to be assembled to a cylinder head includes at least a plurality of (four in the exemplary embodiment) injectors 2A to 2D and a fuel pipe 4. The plurality of injectors 2A to 2D are aligned in a predetermined direction in a plane perpendicular to axial directions of the injectors 2A to 2D, and are fixed to the fuel pipe 4. The fuel-inlet-side end portions 3 of the plurality of injectors 2A to 2D are fit into cup portions 5 formed at predetermined intervals around the fuel pipe 4 extending linearly. Each cup portion 5 has a flange portion 6 formed in a roughly triangular shape at its upper portion. Also, at the lower portions of the cup portions 5 of the injectors 2A to 2D, injector clips 60 which are flat springs are provided for pressing the injectors 2A to 2D against a cylinder head 8. Further, when the injectors 2A to 2D are inserted into the cylinder head 8, tolerance rings 61 which are washers for floating the injectors 2A to 2D on a seating surface on a side of the cylinder head 8 are fit into the injectors 2A to 2D. The tolerance rings 61 have curved surfaces 61a which come into contact with tapered outer circumferential surfaces 62 of the injectors 2A to 2D as shown in FIG. 1B, and are allowed to slide in a radial direction with respect to the injectors 2A to 2D. Also, if the injectors 2A to 2D are inserted into the cylinder head 8, the tolerance rings 61 come into contact with the seating surface of the cylinder head 8, and absorbs offset load when the injectors 2A to 2D are inserted in a tilted state with respect to the cylinder head 8.

This direct injector unit 1 is assembled to the cylinder head 8 by pressing the injectors 2A to 2D into injector mounting holes 7 of the cylinder head 8. In the exemplary embodiment, in a state where the axial directions of the injectors 2A to 2D are oriented in a vertical direction (hereinafter, referred to as a Z direction), the plurality of injectors 2A to 2D are mounted on the fuel pipe 4. Also, the plurality of injectors 2A to 2D are also called first to fourth injectors 2A to 2D in the order from the left of FIG. 2.

A direct-injector-unit assembly apparatus 10 includes a head mounting table 11 on which the cylinder head 8 is mounted in a predetermined posture, an injector holding unit 12 that holds the direct injector unit 1, an inserting unit 13 that inserts the injectors 2A to 2D of the direct injector unit 1 held by the holding unit 12 into the injector mounting holes 7, and a pitch changing unit 14 that is disposed between the injector holding unit 12 and the inserting unit 13 and changes pitches of four holding units 12A to 12D (to be described below) of the injector holding unit 12 according to pitches of the injectors 2A to 2D in their arrangement direction.

The head mounting table 11 is configured such that the plurality of injector mounting holes 7 is parallel with respect to a reference direction (hereinafter, referred to as an 'X direction') in a horizontal plane and the cylinder head 8 is mounted in a posture in which the injector mounting holes 7 are oriented in the Z direction. Also, in FIG. 1A, the head mounting table 11 is simply shown, and a known head mounting table can be applied.

The inserting unit 13 includes a Z movable table 23 that is movable in the Z direction with respect to a base 21, a Z-directional linear guide 22 that guides the Z movable table 23 in the Z direction, and a Z driving device (not shown) that drives the Z movable table 23. The Z-directional linear guide 22 includes a guide rail 22a fixed to the Z movable table 23 along the Z direction, and a slider 22b fixed to the base 21 and straddling the guide rail 22a such that the slider 22b is slidable.

Therefore, if the Z driving device is driven to move the Z movable table 23 together with the injector holding unit 12 in the Z direction (downward), the plurality of injectors 2A to 2D held by the injector holding unit 12 is inserted to the injector mounting holes 7 of the cylinder head 8.

The pitch changing unit 14 includes four X movable tables 25A, 25B, 25C, and 25D which are disposed along the X direction and whose pitches in the X direction with respect to the Z movable table 23 are changeable, an X-directional linear guide 24 that guides the X movable tables 25A, 25B, 25C, and 25D in the X direction, and an X driving device (not shown) that drives the X movable tables 25A, 25B, 25C, and 25D. The X-directional linear guide 24 includes a pair of guide rails 24a fixed to the Z movable table 23 along the X direction, and sliders 24b fixed to the X movable tables 25A, 25B, 25C, and 25D, respectively, and straddling the guide rails 24a such that the sliders are slidable. Therefore, the assembly apparatus 10 can correspond to multiple kinds of cylinder heads 8 which are different in pitches of injector mounting holes 7.

The injector holding unit 12 includes the four holding units 12A to 12D mounted on the X movable tables 25A to 25D, respectively. The holding units 12A to 12D have injector mounting tables 26 extending forward from the X movable tables 25A to 25D in a Y direction (the left/right direction in FIG. 1) perpendicular to the X direction. The lower portions of the injector mounting tables 26 extend forward, and the extending portions constitute injector mounting units 27. Also, at the extending portions of the injector mounting tables 26, a pair of guide rods 30 is provided to stand. At the injector mounting units 27, multiple (four in the exemplary embodiment) U-shaped grooves 28 open forward are formed along the X direction (see FIG. 2). The cup portions 5 of the fuel pipe 4 are disposed to face the U-shaped grooves 28 with small intervals, and the flange portions 6 are mounted on supporting surfaces 27a of the injector mounting units 27 around the U-shaped grooves 28, whereby the direct injector unit 1 is mounted on the injector mounting tables 26 such that the direct injector unit 1 is allowed to slightly move on the supporting surfaces 27a.

Figure 2:
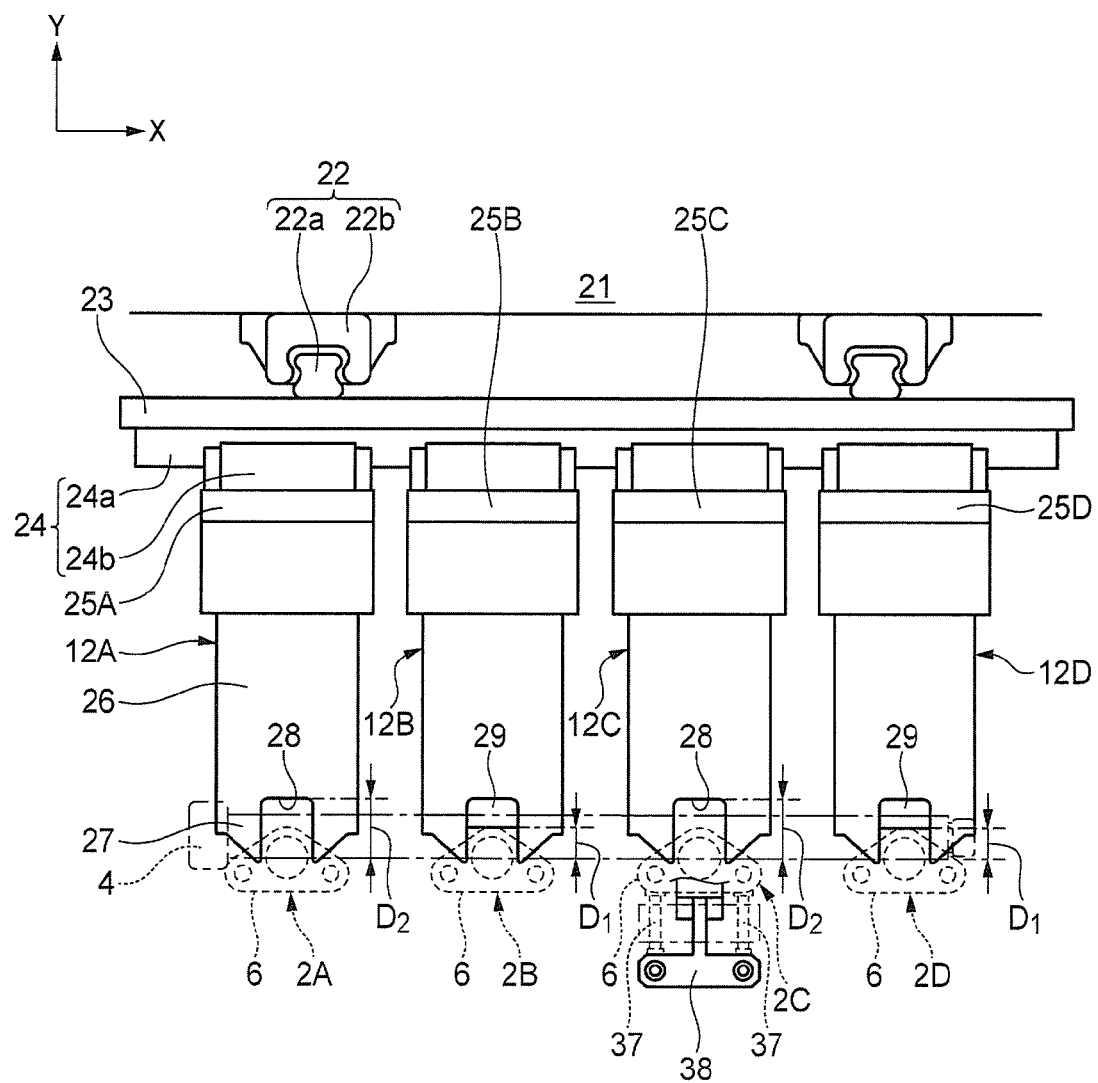
FIG. 2 is a plan view illustrating the assembly apparatus.

On the injector mounting units 27 of the holding units 12B and 12D, positioning members 29 for coming into contact with the end surfaces of the flange portion 6 of the second and fourth injectors 2B and 2D in the Y direction when the injectors 2A to 2D are inserted into the U-shaped grooves 28, thereby correcting a tilt error of the third injector 2C which is the reference injector is disposed (see FIG. 2).

Therefore, when the direct injector unit 1 is positioned in the Z direction on the supporting surfaces 27a of the injector mounting units 27, the flange portions 6 of the second and fourth injectors 2B and 2D mounted on the holding units 12B and 12D come into contact with the positioning members 29, whereby the direct injector unit 1 is held such that the tilt error of the reference injector 2C is corrected, that is, the arrangement direction of the injectors 2A to 2D follows the X direction of the injector holding unit 12.

The positioning members 29 are configured such that the groove depths D1 of the U-shaped grooves 28 of the injector mounting units 27 of the holding units 12B and 12D are shallower than the groove depths D2 of the U-shaped grooves 28 of the injector mounting units 27 of the holding units 12A and 12C. Therefore, a positioning portion for correcting a tilt error of the reference injector 2C may be configured by making the depths of the U-shaped grooves 28 of the injector mounting units 27 of the holding units 12B and 12D shallower than the depths of the U-shaped grooves 28 of the injector mounting units 27 of the holding units 12A and 12C.

On the pair of guide rods 30, a pipe pressing member 31 is mounted to be slidable. The pipe pressing members 31 are connected to connection rods 32 which are driven in the Z direction by an air cylinder (not shown) fixed to the X movable tables 25A to 25D, and the pipe pressing members 31 are guided to the guide rods 30 by operation of the air cylinder such that the pipe pressing members 31 move in the Z direction.

At the lower surfaces of the pipe pressing members 31, inverted U-shaped grooves 33 for relief are formed at positions corresponding to the fuel pipe 4 disposed on the injector mounting units 27. Therefore, if the pipe pressing members 31 descend by the air cylinder, the fuel pipe 4 is kept in the inverted U-shaped grooves 33 and is pressed by the leading end portions of the inverted U-shaped grooves 33 and supporting members 33a.

Also, at the pipe pressing member 31 of the holding unit 12C, an air-cylinder supporting column 34 for supporting an air cylinder 40 is provided to stand. The air cylinder 40 is supported such that its one end portion is swingable on a pin 41 provided on the air-cylinder supporting column 34.

On the leading end of the pipe pressing member 31 of the holding unit 12C, one arm 35a of an L-shaped member 35 is pivotably supported, whereby the L-shaped member 35 is supported to be swingable. Also, the other arm 35b of the L-shaped member 35 is pivotably supported on a piston rod 42 of the air cylinder 40. Further, on the other arm 35b of the L-shaped member 35, a pressing pin holder 38 is fixed, and a pair of pipe pressing pins 37 are fit into the pressing pin holder 38 such that the pipe pressing pins 37 are slidable. Between flanges 37a formed at the leading end portions of the pipe pressing pins 37 and the pressing pin holder 38, coil springs 39 are mounted to bias the pipe pressing pins 37 shown by solid lines downward.

Also, the holding units 12A to 12D include chuck mechanisms 53 formed on the lower surfaces of the injector mounting tables 26, respectively. Each chuck mechanism 53 includes an air cylinder 46 for chucking fixed to the lower surface of a corresponding injector mounting table 26, and a pair of grasping arms 47 that can be guided along a pair of linear guides 45 by operation of the air cylinder 46 for chucking such that the grasping arms 47 linearly move in a mutually separating or approaching direction (X direction).

The paired grasping arms 47 are positioned on both sides of a corresponding one of the injectors 2A to 2D, mounted on the injector mounting units 27, in the X direction, and grasp both side surfaces of the corresponding one of the injectors 2A to 2D. The grasp surfaces of the paired grasping arms 47 to come into contact with the corresponding one of the injectors 2A to 2D are formed in roughly V shapes facing each other in a plan view, and can hold the corresponding one of the cylindrical injectors 2A to 2D while positioning the corresponding injector.

The widths of the paired grasping arms 47 for grasping the side surfaces of the injectors 2A to 2D (widths in the vertical direction in FIG. 3) depend on the holding units 12A to 12D. Specifically, the widths W1 of the paired grasping arms 47 that are disposed on the holding unit 12C and grasp the reference injector 2C are larger than the widths W2 of the paired grasping arms 47 disposed on the remaining holding units 12A, 12B, and 12D.

Therefore, when the paired grasping arms 47 grasp the injectors 2A to 2D, the reference injector 2C is grasped by the paired grasping arms 47 having the large grasp widths W1 such that the reference injector 2C is positioned in a horizontal plane. Meanwhile, the remaining injectors 2A, 2B, and 2D are grasped by the paired grasping arms 47 having the small grasp widths W2, and are guided in a state in which the leading end portions of the injectors 2A, 2B, and 2D are movable.

Also, the chuck mechanisms 53 can be arbitrarily configured as long as when the paired grasping arms 47 grasp the injectors 2A to 2D, the chuck mechanisms 53 position the reference injector 2C, and make the remaining injectors 2A, 2B, and 2D be guided in a state in which their leading end portions are movable. For example, the pressures of the air cylinders 46 may be adjusted such that the grasping forces of the injectors 2A, 2B, and 2D are weaker than the grasping force of the injector 2C, whereby the injectors 2A, 2B, and 2D are guided in a state in which their leading end portions are movable.

Next, a direct-injector-unit assembly procedure of the assembly apparatus of the exemplary embodiment having the above-mentioned configuration will be described.

First, in a posture in which the injector mounting holes 7 are oriented in the Z direction, the cylinder head 8 is mounted on the head mounting table 11. Also, the pitches between the holding units 12A to 12D in the X direction are changed to correspond to the pitches of the injector mounting holes 7 provided in the cylinder head 8, by the pitch changing unit 14.

Figure 3:
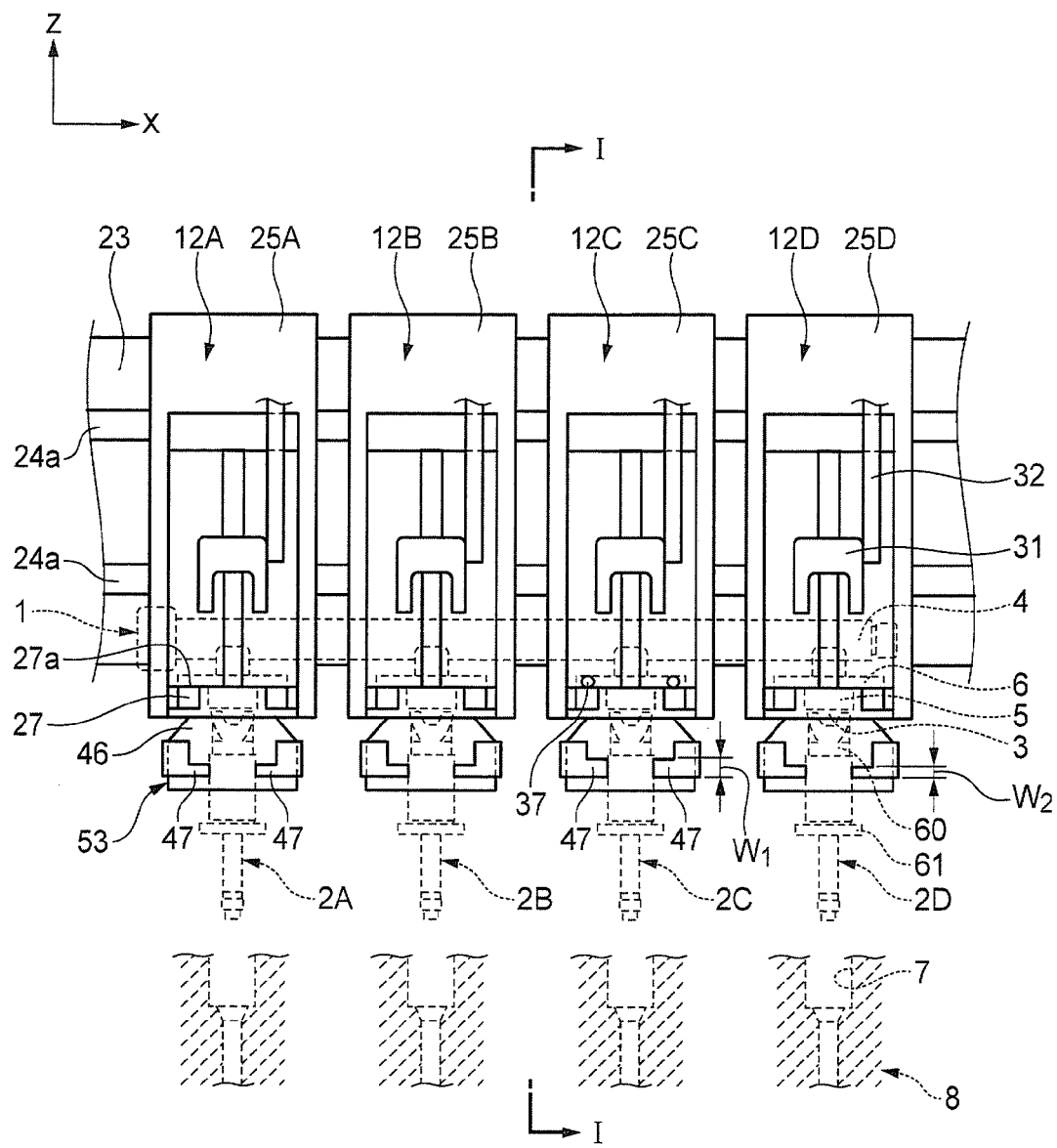
FIG. 3 is a front view illustrating the assembly apparatus.

Next, as shown in FIG. 3, the cup portions 5 of the fuel pipe 4 of the direct injector unit 1 are accommodated in the U-shaped grooves 28 of the injector mounting units 27 of the holding units 12A to 12D, and the lower surfaces of the flange portions 6 are mounted to be horizontally movable on the supporting surfaces 27a of the injector mounting units 27, whereby the injectors 2A to 2D are positioned in the Z direction. Also, simultaneously, the flange portions 6 of the second and fourth injectors 2B and 2D are brought into contact with the positioning members 29 of the holding units 12B and 12D, whereby the tilt error of the reference injector 2C is corrected.

Next, the air cylinder (not shown) connected to the connection rods 32 is operated to lower the pipe pressing members 31, whereby the fuel pipe 4 is accommodated in the inverted U-shaped grooves 33 of the pipe pressing members 31 such that the fuel pipe 4 is held. Also, the air cylinder 40 disposed at the holding unit 12C is operated such that the piston rod 42 stretches, and as shown by a dotted line of FIG. 1, the L-shaped member 35 is clockwise rotated about 90 degrees, whereby a pair of flange pressing pins 37 is brought into contact with a front surface of the flange portion 6 of the reference injector 2C held by the holding unit 12C.

Also, the air cylinders 46 for chucking of the holding units 12A to 12D are operated such that both side surfaces of each of the injectors 2A to 2D are grasped from the X direction by corresponding paired grasping arms 47. Since the grasp surfaces of the paired grasping arms 47 are formed in roughly V shapes facing each other in a plan view, the outer circumferential surfaces of the cylindrical injectors 2A to 2D are held.

In this case, since the widths W1 of the grasping arms 47 disposed at the holding unit 12C are large, the grasping arms 47 grasp the reference injector 2C in a state in which the reference injector 2C is positioned in the X direction and the Y direction in a horizontal plane. In other words, the reference injector 2C is aligned with a corresponding injector mounting hole 7 of the cylinder head 8 with a high degree of accuracy. Meanwhile, since the widths W2 of the grasping arms 47 disposed at the holding units 12A, 12B, and 12D are small, the grasping arms 47 grasp the injectors 2A, 2B, and 2D while guiding in a state in which the leading end portions of the injectors 2A, 2B, and 2D are movable.

Figure 4:
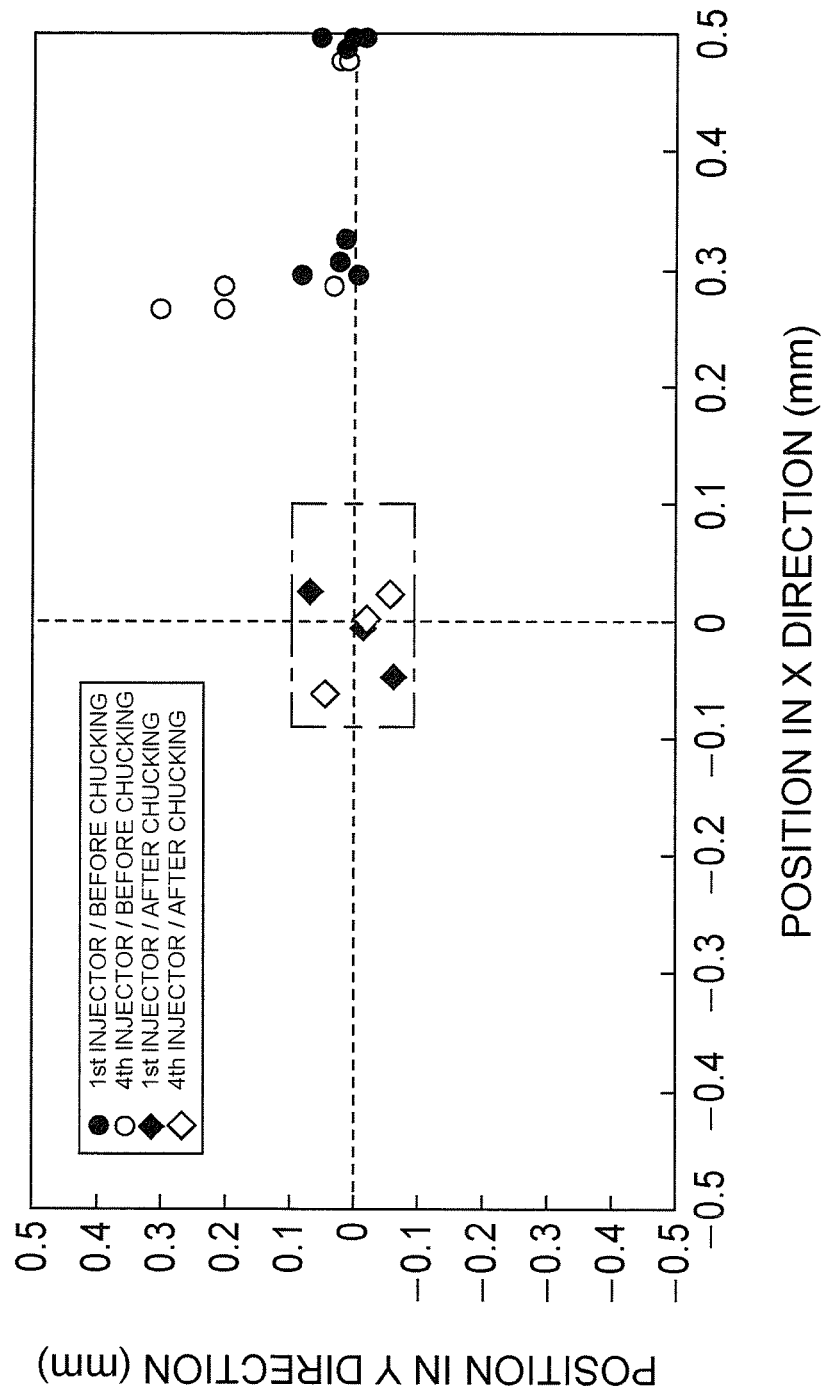
FIG. 4 is a graph illustrating position accuracy of direct injectors before and after chucking.
Figure 5:
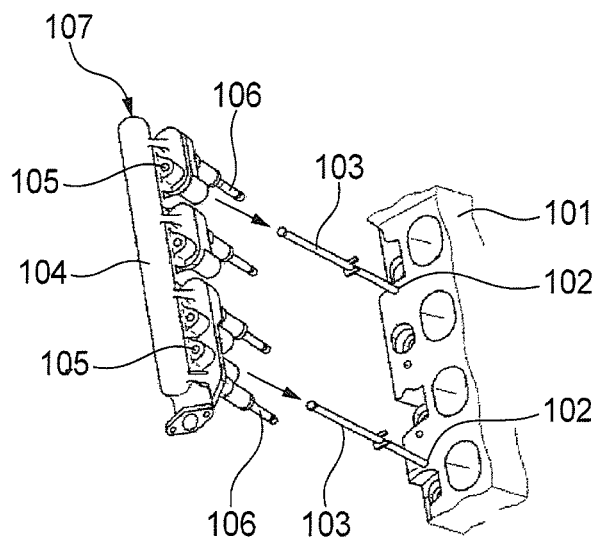
FIG. 5 is a perspective view illustrating a direct-injector-unit assembly apparatus according to a first related art.
Figure 6:
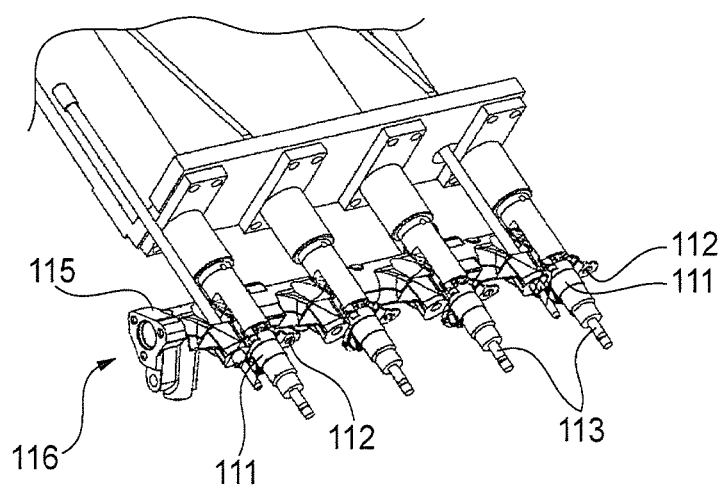
FIG. 6 is a perspective view illustrating another direct-injector-unit assembly apparatus according to a second related art.

FIG. 4 is a graph illustrating the positions of the leading end portions of the first and fourth injectors 2A and 2D before and after the first and fourth injectors 2A and 2D grasped in a state in which their leading end portions are movable and held by the holding units 12A and 12D are grasped by the paired grasping arms 47. From this graph, it can be seen that all large deviations relative to a center value before grasping are significantly reduced by grasping (specifically, to ±0.1 mm or less in the X direction). In other words, since three injectors 2A, 2B, and 2D including the first and fourth injectors 2A and 2D are grasped while being guided in a state where their leading end portions are movable, the three injectors are positioned with respect to the injector mounting holes 7 of the cylinder head 8 with a high degree of accuracy.

Like this, the reference injector 2C is aligned with a corresponding injector mounting hole 7 of the cylinder head 8 with a high degree of accuracy, the remaining injectors 2A, 2B, and 2D are guided in a state in which their leading end portions are movable, and the injectors 2A to 2D are inserted into the injector mounting holes 7 while the Z driving device (not shown) is operated to move the Z movable table 23 (the inserting unit 13) downward such that the fuel pipe 4 is pressed by the leading end portions of the inverted U-shaped grooves 33 and the supporting members 33a, whereby the injectors 2A to 2D are assembled to the cylinder head 8.

When the injectors 2A to 2D are inserted into the injector mounting holes 7, the reference injector 2C aligned with the corresponding injector mounting hole 7 with a high degree of accuracy is smoothly inserted into the corresponding injector mounting hole 7. Also, the remaining injectors 2A, 2B, and 2D held in a state in which their leading end portions are movable are smoothly inserted while being guided to the tapered portions formed at openings of corresponding injector mounting holes 7 such that the injectors 2A, 2B, and 2D are automatically aligned with the corresponding injector mounting holes 7. Further, after the reference injector 2C is aligned with the corresponding injector mounting hole 7, the reference injector 2C may also be unchucked to be guided in a state in which its leading end portion is movable, and be inserted.

As described above, the direct-injector-unit assembly apparatus 10 according to the exemplary embodiment includes the head mounting table 11 on which the cylinder head 8 is mounted in a predetermined posture, the injector holding unit 12 that holds the direct injector unit 1 while positioning the reference injector 2C and guiding the remaining injectors 2A, 2B, and 2D in a state in which their leading end portions are movable at the same time, and the inserting unit 13 that relatively moves the direct injector unit 1 toward the cylinder head 8. Further, according to the assembly method of the exemplary embodiment, the cylinder head 8 is mounted in the predetermined posture on the head mounting table 11, the direct injector unit 1 is held while positioning the reference injector 2C and guiding the remaining injectors 2A, 2B, and 2D in a state in which their leading end portions are movable by the injector holding unit 12, the direct injector unit 1 is moved toward the cylinder head 8 in a state in which the reference injector 2C is aligned with the corresponding injector mounting hole 7 of the cylinder head 8, and the plurality of injectors 2A to 2D are inserted into the injector mounting holes 7 by the inserting unit 13.

Therefore, a worker does not need to mount a jig on the direct injector unit 1, and needs only to set the direct injector unit 1 on the assembly apparatus 10. Therefore, it is possible to reduce a man-hour for assembling, and to assemble the direct injector unit 1 to the cylinder head 8 with a high degree of accuracy, regardless of manufacturing errors of the injector mounting holes 7, variation in the postures of the leading end portions of the injectors, and the degree of worker's proficiency.

Also, the injector holding unit 12 includes the positioning members 29 which come into contact with the flange portions 6 provided to the cup portions 5 of the fuel pipe 4 corresponding to the second and fourth injectors 2B and 2D, thereby correcting the tilt error of the reference injector 2C. Therefore, if the flange portions 6 corresponding to the second and fourth injectors 2B and 2D are brought into contact with the positioning members 29, regardless of the degree of worker's proficiency, it is possible to correct a tilt error of the reference injector 2C by simple operation.

Further, the injector holding unit 12 further includes the injector mounting units 27 that mount the direct injector unit 1 and position the plurality of injectors 2A to 2D in their axial directions, and the chuck mechanisms 53 that grasp the plurality of injectors 2A to 2D of the direct injector unit 1 mounted on the injector mounting units 27, and position the reference injector 2C while guiding the remaining injectors 2A, 2B, and 2D in a state in which their leading end portions are movable. Therefore, if the direct injector unit 1 is mounted on the injector mounting units 27, and the plurality of injectors 2A to 2D are grasped by the chuck mechanisms 53, regardless of the degree of worker's proficiency, it is possible to position the reference injector 2C is positioned, to position the other injectors 2A, 2B, and 2D in their axial direction, and to guide the remaining injectors in a plane perpendicular to their axial direction, by simple operation.

Also, at the injector mounting units 27, the plurality of U-shaped grooves 28 for covering the cup portions 5 of the fuel pipe 4 corresponding to the plurality of injectors 2A to 2D, and the supporting surfaces 27a for supporting the lower surfaces of the flange portions 6 around the U-shaped grooves 28 are provided, and the positioning members 29 are provided to the injector mounting units 27 such that when the lower surfaces of the flange portions 6 of the plurality of injectors 2A to 2D are mounted on the supporting surfaces 27a of the injector mounting units 27, the positioning members 29 can come into contact with the flange portions 6 of the second and fourth injectors 2B and 2D. Therefore, if the lower surfaces of the flange portions 6 of the plurality of injectors 2A to 2D are mounted on the supporting surfaces 27a of the injector mounting units 27 while the flange portions 6 corresponding to the second and fourth injectors 2B and 2D are brought into contact with the positioning members 29, regardless of the degree of worker's proficiency, it is possible to position the reference injector 2C in its axial direction while correcting the tilt error of the reference injector, by simple operation.

The assembly method and the assembly apparatus are not limited to the above-mentioned exemplary embodiment and its modifications, but can be appropriately changed and modified.

The direct injector unit of the exemplary embodiment has four injectors. However, the number of injectors is not limited thereto, but may correspond to the number of cylinders.

Also, the positions of the direct injector unit to come into contact with the positioning portions is not limited to the flange portions, but may be connection portions of the fuel pipe, for example, the cup portions. Further, the injectors to which the positioning portions are provided may be the connection portions of the fuel pipe corresponding to at least one injector adjacent to the reference injector, and are not limited to the connection portions corresponding to the second and fourth injectors of the exemplary embodiment.

Particularly, in the exemplary embodiment, the positioning portions are configured at the holding units 12B and 12D such that the assembly apparatus 10 can be applied to both of a direct 4-cylinder engine and a V-shaped 6-cylinder engine. However, in a case where the assembly apparatus 10 is applied only to the above-mentioned direct 4-cylinder engine, it is preferable to configure the positioning portions at the holding units 12A and 12C and bring the positioning portions into contact with connection portions corresponding to the first and third injectors.

Also, in the exemplary embodiment, the cylinder head 8 is disposed in a posture in which the injector mounting holes 7 are oriented in the vertical direction. However, the assembly method and the assembly apparatus are not limited thereto. The cylinder head 8 may be disposed in a posture in which the injector mounting holes 7 are obliquely oriented. In this case, the injector holding unit 12 and the inserting unit 13 may also be configured to hold the plurality of injectors 2A to 2D in parallel with the orientations of the injector mounting holes 7 and insert the plurality of injectors 2A to 2D into the injector mounting holes 7 along the orientations.

Further, the injector holding unit for holding the direct injector unit is not limited to the configuration of the exemplary embodiment as long as the injector holding unit positions the reference injector and guides the remaining injectors in a state in which their leading end portions are movable.

Furthermore, the configurations of the injectors 2A to 2D are not limited to those of the exemplary embodiment, but may not have the tolerance rings 61.

In accordance with embodiments and modifications, a direct-injector-unit assembly method in which a direct injector unit 1 that includes at least a plurality of injectors 2A to 2D aligned in a predetermined direction within a plane perpendicular to axial directions of the injectors 2A to 2D and a fuel pipe 4 to which the plurality of injectors 2A to 2D are fixed is assembled to the to a cylinder head 8 may comprise: a process of mounting the cylinder head 8 in a predetermined posture; a process of holding the direct injector unit 1, while positioning a reference injector 2C of the plurality of injectors and guiding remaining injectors 2A, 2B, 2D in a state in which their leading end portions are movable; and a process of inserting the plurality of injectors 2A to 2D into injector mounting holes 7 of the cylinder head 8 by relatively moving the direct injector unit 1 toward the cylinder head 8 in a state in which the reference injector 2C is positioned with respect to a corresponding one of the injector mounting holes 7.

The process of holding the direct injector unit may include: a process of correcting a tilt error of the reference injector 2C, by bringing a connection portion 5 of the fuel pipe 4 corresponding to at least one injector 2B, 2D adjacent to the reference injector 2C into contact with positioning portions 29.

The process of holding the direct injector unit may further include: a process of positioning the plurality of injectors 2A to 2D in the axial directions thereof by mounting the direct injector unit 1 on injector mounting units 27; and a process of grasping the plurality of injectors 2A to 2D in a condition that the reference injector 2C is positioned while the remaining injectors 2A, 2B, 2D are guided such that their leading end portions are movable.

In the connection portions 5 of the fuel pipe 4, flange portions 6 may be formed. The injector mounting units 27 may include: a plurality of grooves 28 that cover the connection portions 5 of the fuel pipe 4 corresponding to the plurality of injectors 2A to 2D; and supporting surfaces 27a that support lower surfaces of the flange portions 6 around the grooves 28. In the process of holding the direct injector unit, the reference injector 2C may be positioned in its axial direction while the tilt error of the reference injector 2C is corrected, by mounting the lower surfaces of the flange portions 6 of the plurality of injectors 2A to 2D on the supporting surfaces 27a of the injector mounting units 27 while bringing the connection portion 5 of the fuel pipe 4 corresponding to said at least one injector 2B, 2D adjacent to the reference injector 2C into contact with the positioning portions 29.

In accordance with embodiments and modifications, a direct-injector-unit assembly apparatus 10, in which a direct injector unit 1 is assembled to a cylinder head 8, and in which the direct injector unit 1 includes at least a plurality of injectors 2A to 2D aligned in a predetermined direction within a plane perpendicular to axial directions of the injectors 2A to 2D and a fuel pipe 4 to which the plurality of injectors 2A to 2D are fixed, may comprise: a head mounting table 11 on which the cylinder head 8 is mounted in a predetermined posture; an injector holding unit 12 that holds the direct injector unit 1 while positioning a reference injector 2C of the plurality of injectors 2A to 2D and guiding remaining injectors 2A, 2B, 2D in a state in which their leading end portions are movable; and an inserting unit 13 that relatively moves the direct injector unit 1 toward the cylinder head 8 in a state in which the reference injector 2C is positioned with respect to a corresponding one of injector mounting holes 7 of the cylinder head 8, and inserts the plurality of injectors 2A to 2D into the injector mounting holes 7.

The injector holding unit 12 may include positioning portions 29 that come into contact with connection portions 5 of the fuel pipe 4 corresponding to at least one injector 2B, 2D adjacent to the reference injector 2C, thereby correcting a tilt error of the reference injector 2C.

The injector holding unit 12 may further include: injector mounting units 27 on which the direct injector unit 1 is mounted so as to position the plurality of injectors 2A to 2D in their axial directions, and chuck mechanisms 53 that grasp the plurality of injectors 2A to 2D of the direct injector unit 1 mounted on the injector mounting units 27, and position the reference injector 2C while guiding the remaining injectors 2A, 2B, 2D in the state in which their leading end portions are movable.

The connection portions 5 of the fuel pipe 4 may be formed with flange portions 6. The injector mounting unit 27 may include a plurality of grooves 28 that cover the connection portions 5 of the fuel pipe 4 corresponding to the plurality of injectors 2A to 2D, and supporting surfaces 27a that support lower surfaces of the flange portions 6 around the grooves 28. The positioning portions 29 may be provided in the injector mounting units 27 such that when the lower surfaces of the flange portions 6 of the plurality of injectors 2A to 2D are mounted on the supporting surfaces 27a of the injector mounting units 27, the positioning portions 29 may come into contact with the connection portions 5 of the fuel pipe 4 corresponding to said at least one injector 2B, 2D adjacent to the reference injector 2C.

What is claimed is:

1. A direct-injector-unit assembly apparatus, in which a direct injector unit is assembled to a cylinder head, the direct injector unit including at least a plurality of injectors aligned in a predetermined direction within a plane perpendicular to axial directions of the injectors and a fuel pipe to which the plurality of injectors are fixed, the apparatus comprising:
a head mounting table on which the cylinder head is mounted in a posture in which a plurality of injector mounting holes of the cylinder head align in a reference direction within the plane and the injector mounting holes are oriented in the axial directions of the injectors;
an injector holding unit that holds the direct injector unit while positioning a reference injector of the plurality of injectors and guiding remaining injectors in a state in which leading end portions of the remaining injectors are movable; and
an inserting unit that relatively moves the direct injector unit toward the cylinder head along the axial directions of the injectors in a state in which the reference injector is positioned with respect to a corresponding one of the injector mounting holes, the remaining injectors are guided by tapered portions formed at openings of the corresponding injector mounting holes, and inserts the plurality of injectors into the injector mounting holes, wherein the injector holding unit includes positioning portions that correct a tilt error of the reference injector by coming into contact with connection portions of the fuel pipe corresponding to at least one injector adjacent to the reference injector;

wherein the injector holding unit further includes a biasing member that comes into contact with a connection portion of the fuel pipe corresponding to the reference injector and aligns the plurality of injectors along the predetermined direction, thereby correcting the tilt error of the reference injector.

2. The apparatus according to claim 1, wherein the injector holding unit further includes:

injector mounting units on which the direct injector unit is mounted so as to position the plurality of injectors in their axial directions in a state that the axial directions of the injectors are oriented in the axial directions of the injector mounting holes, and chuck mechanisms that grasp the plurality of injectors of the direct injector unit mounted on the injector mounting units, and position the reference injector while guiding the remaining injectors in a state in which their leading end portions are movable.

3. The apparatus according to claim 2, wherein the connection portions of the fuel pipe are formed with flange portions, wherein the injector mounting unit includes a plurality of grooves that cover the connection portions of the fuel pipe corresponding to the plurality of injectors, and supporting surfaces that support lower surfaces of the flange portions around the grooves, and wherein the positioning portions are provided in the injector mounting units such that when the lower surfaces of the flange portions of the plurality of injectors are mounted on the supporting surfaces of the injector mounting units, the positioning portions come into contact with the connection portions of the fuel pipe corresponding to said at least one injector adjacent to the reference injector.

* * * * *